United States Patent [19]

Nomura et al.

[11] Patent Number: 4,632,447
[45] Date of Patent: Dec. 30, 1986

[54] SIDE DOOR HINGE MECHANISM IN A MOTOR VEHICLE

[75] Inventors: Kazuhiro Nomura, Anjou; Masayuki Nomura, Toyota, both of Japan

[73] Assignee: Toyota Jidosha Kabushiki Kaisha, Japan

[21] Appl. No.: 638,788

[22] Filed: Aug. 8, 1984

[30] Foreign Application Priority Data

Aug. 9, 1983 [JP] Japan ............................ 58-123460[U]

[51] Int. Cl.$^4$ .............................. B60J 5/04; B60J 9/00; E05D 3/06
[52] U.S. Cl. .................................... 296/153; 296/198; 296/202; 296/146; 49/248; 16/366
[58] Field of Search ......................... 296/146, 149–153, 296/198, 202; 49/208, 246, 248; 16/302, 366, 367

[56] References Cited

U.S. PATENT DOCUMENTS

| | | | |
|---|---|---|---|
| 2,068,505 | 1/1937 | Morrison | 296/153 |
| 3,006,683 | 10/1961 | Smith | 49/248 |
| 3,074,755 | 1/1963 | Péras | 49/248 |
| 3,095,600 | 7/1963 | Bretzner | 49/248 |
| 3,158,395 | 11/1964 | Smith | 49/246 |
| 3,801,149 | 4/1974 | Reimann | 296/153 |

Primary Examiner—Robert B. Reeves
Assistant Examiner—Dennis H. Pedder
Attorney, Agent, or Firm—Finnegan, Henderson, Farabow, Garrett & Dunner

[57] ABSTRACT

A hinge mechanism for a vehicle door, in which a vehicle body includes a door section having an arm rest extending along an interior portion thereof. The bottom surface of the arm rest contains a recessed section defined along the vehicle interior by a contour line extending along at least a forward portion of the bottom surface of the arm rest. A support arm extends between the door section and the vehicle body to provide primary support for the door section. A control arm with attached cover extends between the door section and the vehicle body for guiding the door section when the door section is opened and closed. The support arm and the control arm are pivotally attached to both the door section and the vehicle body. The control arm and cover have a cross-sectional dimension, when viewed from above, substantially corresponding to the contour line, enabling the control arm and cover to be substantially flush with the contour line when the door is closed.

18 Claims, 2 Drawing Figures

SIDE DOOR HINGE MECHANISM IN A MOTOR VEHICLE

BACKGROUND OF THE INVENTION

1. Field of the Invention

This invention relates to a side door hinge mechanism utilizing a quadric crank chain in a motor vehicle.

2. Description of the Prior Art

In most cases, the side door in a motor vehicle, such as a passenger car has heretofore been installed in a manner to be rotatable about a hinge affixed to a vehicle body for opening or closing of the door. In order to allow an occupant of the motor vehicle to open or close the side door for getting in or out of the motor vehicle, a door opening angle corresponding to the total length of the side door is required. Typically, when a space at the side of the motor vehicle is small, there are many cases where it is difficult for the occupant to get on or off the vehicle because the side door cannot be opened sufficiently.

To eliminate this difficulty, there has been proposed a side door hinge mechanism in a motor vehicle, as shown in U.S. Pat. Nos. 3,095,600 and 3,400,974, for example, wherein a quadric crank chain comprises a front rotary link disposed along the forward side of a vehicle body and connecting a side door to the vehicle body between rotary shafts disposed on the vehicle body and the side door, a rear rotary link disposed at the rear of the front rotary link, and connecting the side door and the vehicle body between rotary shafts, a portion extending along the vehicle body between the front and rear rotary links, and a portion extending along the side door between the front and rear rotary links.

In the side door hinge mechanism utilizing the above-described quadric crank chain, the rear rotary shaft for the rear rotary link is secured to an intermediate position along the longitudinal direction of an inner panel of the side door.

As a consequence, the rear rotary link protrudes into a compartment, interfering with a body or an arm of a driver or an occupant. There is also a risk that a finger may be pinched between the rear rotary link and the inner panel of the side door. Further the appearance of the interior of the compartment may be deteriorated.

SUMMARY OF THE INVENTION

It is therefore the primary object of the present invention to provide a side door hinge mechanism in a motor vehicle, wherein the rear rotary link does not interfere with an arm or body of an occupant, a finger or the like of the occupant is not pinched between the rear rotary link and the inner panel of the side door, and the appearance of the interior of the compartment is not deteriorated.

To this end, the present invention contemplates that, in a side door hinge mechanism in a motor vehicle, wherein a quadric crank chain comprises a front rotary link or support arm disposed between the forward sides of a vehicle body and a side door through rotary shafts mounted on the vehicle body and the side door, a rear rotary link or control arm interconnecting the rear sides of the vehicle body and the side door through rotary shafts, a portion between the front and rear rotary links along the vehicle body, and a portion between the front and rear rotary links along the side door, the rear rotary link is disposed at a position having such a height that the rear rotary link is received in a manner to be closely aligned with the bottom portion of an arm rest when the side door is closed. Consequently, the rear rotary link is substantially concealed when viewed from above by close alignment with the bottom portion of the arm rest when the door is closed, so that interference between the rear rotary link and an arm, body or the like of an occupant is avoided, the pinching of a finger between the rear rotary link and the inner panel of the side door is prevented, and the appearance of the interior of the compartment when the door is closed is comparable to that of a motor vehicle having the conventional hinge mechanism.

To the above end, the present invention contemplates that the arm rest be provided along the bottom portion thereof with a recess having a height and a depth in the direction of the thickness of the side door corresponding to a height and a width of the rear rotary link, whereby the rear rotary link is received in the recess when the door is closed, so that the rear rotary link appears to be part of the arm rest when the door is closed.

To the above end, the present invention contemplates that said arm rest is formed along the bottom portion thereof with a recess having a height and a depth in the direction of the thickness of the door corresponding to a height and a width of said rear rotary shaft, whereby said rear rotary link is received in said recess when the door is closed.

To the above end, the present invention contemplates that the rotary shaft connecting the rear rotary link and the side door is disposed along the bottom portion of said arm rest and the rotary shaft connecting the rear rotary link and the vehicle body is disposed at the rear side surface of a front pillar.

To the above end, the present invention contemplates that the rear rotary shaft of said front rotary link is secured to an end panel of said side door on the front of the side door, the front rotary shaft of said front rotary link is disposed at the outer side surface of the front pillar.

To the above end, the present invention contemplates that the front rotary shaft of said front rotary link is disposed at a position on the inner surface of a movable portion of a front fender and a part of said front fender is separated from a fixed main body of the front fender, so that the movable fender portion allows the front rotary link to turn outward about the front rotary shaft.

DETAILED DESCRIPTION OF THE PREFERRED EMBODIMENT

Description will be given of one embodiment of the present invention with reference to the drawings.

Figure 1:
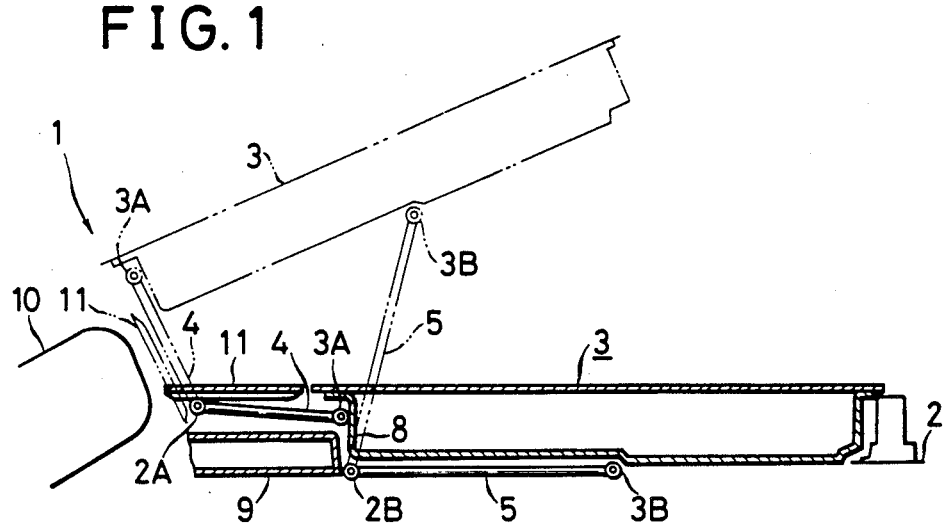
FIG. 1 is a schematic sectional plan view showing one embodiment of the side door hinge mechanism in a motor vehicle according to the present invention.
Figure 2:
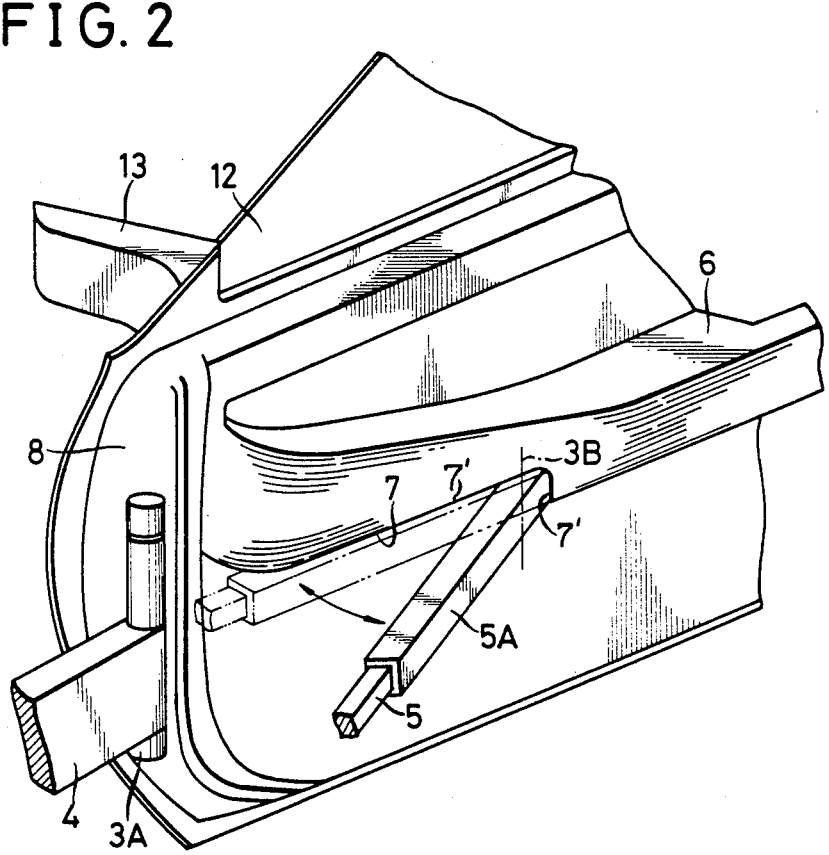
FIG. 2 is a perspective view, partially sectional, showing the essential portions of the above embodiment.

As shown in FIGS. 1 and 2, according to this embodiment, in a side door hinge mechanism in a motor vehicle, wherein a quadric crank chain comprises: a front rotary link or support arm 4 connected between the forward sides of a vehicle body 2 and a side door 3 in a motor vehicle 1 through rotary shafts 2A and 3A; a rear rotary link 5 or control arm interconnecting the rear sides of the vehicle body 2 and the side door 3 through rotary shafts 2B and 3B; a portion between the front rotary link 4 and the rear rotary link 5 on the vehicle body 2; and a portion between the front rotary link 4 and the rear rotary link 5 on the side door 3, the rear rotary link 5 being disposed at a position having such a height that the rear rotary link 5 is substantially aligned the bottom portion of an arm rest 6 when the side door 3 is closed.

The bottom portion of the arm rest 6 is formed with a recess 7 having a contour line 7' defining a height and a depth in the direction of the thickness of the door corresponding to a height and a width of the rear rotary link 5, so that the rear rotary link 5 is positioned in the recess 7.

In FIG. 2, designated at 5A is a substantially rectangular arm cover for covering the rear rotary link 5, made of a material identical with that of the material covering the arm rest 6.

More specifically, the rear rotary link 5 is received in the recess 7 of the arm rest 6 when the side door 3 is closed, and the outer side surface and the bottom portion of the rear rotary link 5 are substantially flush with the outer side surface and the bottom portion of the arm rest 6, so that the outer side surface and the undersurface of the rear rotary link 5 substantially correspond with the configuration of the arm rest 6.

The rotary shaft 3B of the rear rotary link 5 on the side door 3 is secured to the arm rest 6 and projects from above into the recess 7 along a rearward end position of the recess 7.

According to this embodiment, the rotary shaft 3A of the front rotary link 4 is secured to an end panel 8 of the side door 3, so that the front rotary link 4 is not exposed to the compartment when the door is closed.

Further, both rotary shafts 2A and 2B are secured to a front pillar 9 at positions spaced apart in the longitudinal direction of the vehicle.

In FIG. 1, designated at 10 is a front wheel, 11 a movable fender connected to the rotary shaft 2A allowing the movable fender 11 and the front rotary link 4 to pivot together when the side door 3 is opened, 12 a door glass and 13 a door mirror.

In this embodiment, the rear rotary link 5 is received in the recess 7 of the arm rest 6 when the door is closed to form a part of the arm rest 6. The appearance of the arm rest 6 is similar to that of the arm rest 6 in the side door 3 having the conventional hinge mechanism, so that the interference of the rear rotary link 5 with an arm or the like of the occupant can be avoided, the pinching of a finger between the rear rotary link 5 and the side door 3 can be prevented, and further, the appearance presents no unusual feeling so as not to deteriorate the appearance of the interior of the compartment.

Furthermore, in the above embodiment, the recess 7 is formed at the bottom portion of the arm rest 6, so that the rear rotary link 5 is received in the recess 7. However, the present invention need not necessarily be limited to this configuration, and such an arrangement may be adapted so that the rear rotary link 5 is received by being closely aligned the bottom portion of the arm rest 6 when the side door 3 is closed.

However, the arrangement, in which the rear rotary link 5 is received in the recess 7 as in the above embodiment, provides an essentially integral construction between the rear rotary link 5 and the arm rest 6 to thereby improve the appearance.

What is claimed is:

1. A hinge mechanism for a vehicle door comprising:
   a vehicle body including a fender section and a door section, said fender section positioned adjacent to said door section and also forward of said door section as defined relative to the length of the vehicle body, said door section having an arm rest extending along an interior portion thereof, said arm rest including a bottom surface having a recessed section defined by a contour line extending along at least a forward portion of said bottom surface of said arm rest;
   support means extending between said door section and said vehicle body for providing primary support for said door section, said support means including a support arm and first pivot means for pivotally connecting said support arm to said vehicle body and said door section, wherein said first pivot means includes a first shaft means for pivotally mounting said support arm on said vehicle body and second shaft means pivotally mounting said door section on an end of said support arm opposite said first shaft means;
   control means extending between said door section and said vehicle body for guiding said door section when said door section is opened and closed, said control means including control arm means and second pivot means mounted at opposite ends of said control arm means for pivotally connecting said control arm means to said vehicle body and to said door section, said second pivot means enabling said control arm means to pivot with said support arm when said door section is opened and closed, said control arm means having a cross-sectional dimension substantially corresponding to said recessed section, enabling said control arm means to be substantially flush with said contour line, when said door is closed.

2. The hinge mechanism defined in claim 1, wherein said control arm means has a substantially rectangular cross-section and includes an upper surface extending substantially perpendicular to said door section, said upper surface being aligned within said recessed section and substantially adjacent said bottom surface of said arm rest.

3. The hinge mechanism defined in claim 1, wherein said second pivot means includes a support shaft depending from said arm rest within said recessed section.

4. The hinge mechanism defined in claim 1, wherein said support arm is mounted forward of said control arm means relative to said vehicle frame.

5. The hinge mechanism defined in claim 1, wherein said support arm and said control arm means are substantially rectangular, and wherein a vertical cross-section of said support arm is substantially larger than a corresponding vertical cross-section of said control arm means.

6. The hinge mechanism defined in claim 1, wherein said fender section includes a movable fender portion attached to said first shaft means and pivoted together with said support arm.

7. The hinge mechanism defined in claim 1, wherein said vehicle body includes a front pillar, said first shaft means being adapted to be attached to said front pillar.

8. The hinge mechanism defined in claim 7, wherein a forward portion of said door section includes an end panel extending between the exterior and interior of the vehicle, said second shaft means being mounted on said end panel.

9. The hinge mechanism defined in claim 6, wherein said end panel is substantially adjacent said front pillar when said door section is closed.

10. A hinge mechanism for a vehicle door comprising:

a vehicle body including a fender section and a door section, said fender section positioned adjacent to said door section and also forward of said door section as defined relative to the length of the vehicle body, said door section including an arm rest having a recessed section defined along the vehicle interior by a contour line extending along at least a forward portion of said arm rest;

support means extending between said door section and said vehicle body for providing primary support for said door section, said support means including a support arm and first pivot means for pivotally connecting said support arm to said vehicle body and said door section, wherein said first pivot means includes a first shaft means for pivotally mounting said support arm on said vehicle body and second shaft means pivotally mounting said door section on an end of said support arm opposite said first shaft means;

control means extending between said door section and said vehicle body for guiding said door section when said door section is opened and closed, said control means including a control arm means and second pivot means mounted at opposite ends of said control arm means for pivotally connecting said control arm means to said vehicle body and to said door section, said second pivot means enabling said control arm means to pivot with said support arm when said door section is opened and closed, said control arm having a cross-sectional dimension enabling said control arm means to be aligned substantially within said recessed section when said door is closed.

11. The hinge mechanism defined in claim 10, wherein said control arm means has a substantially rectangular cross-section and includes an upper surface extending substantially perpendicular to said door section and wherein said recessed section extends along a bottom surface of said arm rest, said upper surface of said control arm means being aligned within said recessed section and substantially adjacent said bottom surface of said arm rest.

12. The hinge mechanism defined in claim 10, wherein said second pivot means includes a support shaft depending from said arm rest within said recessed section.

13. The hinge mechanism defined in claim 10, wherein said support arm is mounted forward of said control arm means along said vehicle frame.

14. The hinge mechanism defined in claim 10, wherein said support arm and said control arm means are substantially rectangular, and wherein a vertical cross-section of said support arm is substantially larger than a corresponding vertical cross-section of said control arm means.

15. The hinge mechanism defined in claim 10, wherein said fender section includes a movable fender portion attached to said first shaft means and pivoted together with said support arm.

16. The hinge mechanism defined in claim 10, wherein said vehicle body includes a front pillar, said first shaft means being adapted to be attached to said front pillar.

17. The hinge mechanism defined in claim 16, wherein a forward portion of said door section includes an end panel extending between the exterior and interior of the vehicle, said second shaft means being mounted on said end panel.

18. The hinge mechanism defined in claim 17, wherein said end panel is substantially adjacent said front pillar when said door section is closed.

* * * * *